United States Patent [19]

Masumoto

[11] Patent Number: 4,903,852
[45] Date of Patent: Feb. 27, 1990

[54] PLASTICS CONTAINER

[75] Inventor: Kazuhiro Masumoto, Ichihara, Japan

[73] Assignee: Mitsui Petrochemical Industries, Ltd., Tokyo, Japan

[21] Appl. No.: 301,285

[22] Filed: Jan. 25, 1989

Related U.S. Application Data

[62] Division of Ser. No. 783,591, Oct. 3, 1985.

[30] Foreign Application Priority Data

| Oct. 4, 1984 | [JP] | Japan | 59-207101 |
| Dec. 12, 1984 | [JP] | Japan | 59-187355 |
| May 22, 1985 | [JP] | Japan | 60-25098 |
| May 22, 1985 | [JP] | Japan | 60-108249 |
| May 22, 1985 | [JP] | Japan | 60-108250 |

[51] Int. Cl.⁴ ................................................ B65D 7/00
[52] U.S. Cl. ........................................ 220/5 R; 220/70
[58] Field of Search ................ 220/5 R, 70, 72, 466, 220/DIG. 1; 215/1 C

[56] References Cited

U.S. PATENT DOCUMENTS

| 3,647,110 | 3/1972 | Hammes | 220/72 |
| 3,927,790 | 12/1975 | Chase et al. | 220/5 R X |
| 4,033,473 | 7/1977 | Raley et al. | 220/5 R X |
| 4,088,239 | 5/1978 | Uhlig | 220/5 R |
| 4,171,751 | 10/1979 | Schütz | 220/466 X |
| 4,257,527 | 3/1981 | Snyder et al. | 220/5 R X |
| 4,500,007 | 2/1985 | Stoll, III | 220/5 R X |
| 4,525,401 | 6/1985 | Pocock et al. | 220/70 X |
| 4,643,323 | 2/1987 | Schütz | 220/5 R X |
| 4,674,648 | 6/1987 | Przytulla | 220/5 R X |
| 4,823,683 | 4/1989 | Meisner | 220/70 X |

Primary Examiner—Steven M. Pollard
Attorney, Agent, or Firm—Armstrong, Nikaido, Marmelstein, Kubovcik & Murray

[57] ABSTRACT

A blow-molding method and its apparatus and a molded drum thereby are improved in that: a lower mold is divided into two pieces, i.e., a split-type mold having a ring-like configuration and a lower mold itself, so that the molding operation of a chime of the molded drum is facilitated.

1 Claim, 13 Drawing Sheets

PLASTICS CONTAINER

This is a division, of application Ser. No. 783,591 filed Oct. 3, 1985.

BACKGROUND OF THE INVENTION

1. Field of the Invention:

The present invention relates to a hollow-molding method and a molding apparatus for conducting the same method and a container manufactured by the same method, and particularly to a plastics container provided with a projection generally called "chime" in its top portion, and a method and an apparatus for molding the same container, which chime has a predetermined configuration with predetermined width and height.

2. Description of the Prior Art:

In the plastics container, particularly, in a large-size one a capacity of which is 50 to 200 1 in its volume, there is provided a projection, for example such as an angular flange having a predetermined configuration with predetermined width and height in order to facilitate its handling and shipping, which projection is generally called "chime". It is generally preferable that the chime is wider in its width and higher in its height.

Hitherto, in a conventional method for forming the chime, the chime is manufactured according to the actuator process. However, in such conventional method, the following problems exist: namely.

(I) it is difficult to obtain a good timing for moving a mold;

(II) restrictions on the width and the height of the chime exist;

(III) operation of the mold is complex; and (IV) in case that a plastics having a good fluidity is employed, such plastics is apt to drip in molding operation of a container so that a biased wall thickness is apt to be produced in such molded container.

Further, anoth conventional molding method and apparatus have been proposed in Japanese Patent Laid-open No. 207101/1984 filed by the applicant for the present application, which conventional apparatus is shown in FIG. 2, wherein: the reference numeral 1 designates a die for extruding molten resin; the numeral 2 designates a lower mold with a concave portion 2a which has a predetermined configuration and predetermined width and heigh; the numeral 3 designates a lift cylinder for performing an up-and-down movement of the lower mold 2; the numeral 4 designates an aie nozzle provided in the lift cylinder 3; the numerals 5A and 5B designate a pair of opposite side molds; the numerals 6A and 6B designate a pair of opposite cylinders for moving the opposite side molds 5A and 5B; the numeral 7 designates a hole for passing a heated steam or a cooling water; and the numeral 8 designates a cooling water hole. All of the inner surfaces of the lower mold 2, and the opposite side molds 5A and 5B and the lower surface of the die 1 are coated with fluorine contained resin. Incidentally, a notch portion 1a is formed in a peripheral portion of the the die 1, in which notch portion 1a the lower mold 2 is inserted. On the other hand, for facilitating an operation of a drum handling machine in shipping, as shown in FIG. 5 the chime "A" is provided with a projecting portion A1 in its lower outer periphery. Due to such provision of the projecting portion A1, an outside ring portion of the concave portion 2a of the lower mold 2 is formed into a separate split mold, i.e., a chime ring B which is provided with a notch portion B1 corresponding to the projecting portion A1, to make it possible that the chime ring B is separated from the chime when the molding operation of the product is completed.

On the other hand, in such apparatus, after the lower mold 2 is lifted so that the lower mold 2 is brought into a press contact with the die 1 to form a top portion of the plastics container, the lower mold 2 is lowered to perform a parting operation of the plastics product. At this time, since the molten resin received in the chime A portion swells again so that the chime ring B is pushed up in the notch portion B1 thereof, the chime ring B is lifted. Consequently, the top portion of the chime ring B projects upward beyond the predetermined level when the lower mold 2 is lowered to a predetermined position. As a result, at a time when the side molds 5A, 5B are closed, such side molds 5A, 5B interferes with the chime ring B to jam the same while the projecting portion A1 varies in its width. Consequently, in the conventional molding apparatus, the parting operation of the lower mold 2 constitutes one step in the molding operation to extend a necessary molding time and to make it difficult to automate the molding operation.

Further, in the molding operation of the plastics container by means of the conventional blow-molding apparatus, there is a tendency to produce a V-shaped notch N in its pinch-off portion as shown in FIG. 15D to decrease an impact strength of the molded product in drop and to make it easy that the molded product is exfoliated. These are problems inherent in the conventional molding method and apparatus.

In order to resolve the above problems, it is possible to modify the pinch-off portion of the mold in its configuration and to modify the molding conditions, particularly to decrease a mold-clamping speed , so that it is possible to improve the pinch-off portion to the extent of a condition shown in FIG. 15E. However, such improvement is not sufficient, while the decrease in the mold-clamping speed leads to a poor operativity. the inventor of the present invention has been found that a cooling speed of the parison in the prior art causes the above problems, from various researches.

On the other hand, as the drum becomes larger in size, the drum becomes to be mechanically transferred, stacked and stored, by means of a special handling machine, for example such as the drum handling machine. Consequently, it is necessary to make it possible that the drum is easily and surely clamped by the handling machine and detached easily and surely therefrom. However, the drum molded by the conventional method and apparatus has the following problems:

(1) it is difficult to glasp the chime of the drum by the handling machine;

(2) the ground plate of the drum is substantially in diameter similar to the top portion of the same drum to make it difficult to stack the drums into neat piles;

(3) since in a falling down condition the drum contacts the ground in its whole trunk, it is difficult to change its rolling direction; and (4) since the up and down sides of the drum are not changed, the bottom surface of the ground plate is always subjected to a load, while since the pinch-off portion is formed in the bottom surface of the ground plate in a lateral straight line manner, the ground plate lacks in rigidity in the bottom surface thereof.

SUMMARY OF THE INVENTION

It is an object of the present invention to provide a method and an apparatus for molding a plastics container and the thus molded plastics container, so that a chuck having a desired configuration is formed as it is designed with a simple mold operation control in the top portion of the container with the use of any resin.

According to a first aspect of the present invention, there is provided a method for molding a plastics container, in which method: there are provided a lower mold provided with a concave portion for forming a top portion of the plastics container having a chime in its top portion, which concave portion has a predetermined configuration with predetermined width and height; and a pair of opposite side molds for molding a side and bottom portions of the plastics container, which lower mold is lifted toward a die by means of a lift cylinder to form a predetermined clearance between the die and itself so that a predetermined amount of a molten resin is extruded from the die, and then the lower mold is further lifted by means of the lift cylinder to be brought into a press contact with the die so that the top portion of the plastics container is molded, and therefore the molten resin is furether extruded from the die at a predetermined parison speed according to which speed the lift cylinder is lowered to a predetermined position so that the lower mold is lowered to a predetermined position in which position the opposite side molds are closed so that a blow-molding operation is conducted to mold the plastics container provided with the chime in its top portion.

According to a second aspect of the present invention, there is provided a method for molding a plastics container, in which method: there are provided a lower mold provided with a concave portion for forming a top portion of the plastics container having a chime in its top portion, which concave portion has a predetermined configuration with predetermined width and height; and a pair of opposite side molds for molding a side and bottom portions of the plastics container, which lower mold is lifted toward a die by means of a lift cylinder to form a predetermined clearance between the die and itself so that a predetermined amount of a molten resin is extruded from the die, and then the lower mold is further lifted by means of the lift cylinder to be brought into a press contact with the die so that the top portion of the plastics container is molded, and thereafter the molten resin is further extruded from the die at a predetermined parison speed according to which speed the lower mold is further lowered to a further lower position than a predetermined position by means of the lift cylinder, in which further lower position the lower mold is temporarily held in a stationary condition in which condition the side molds are closed, and then the lower mold is lifted again by the lift cylinder to be brought into abutting contact with the side molds so that the lower mold is positioned in a predetermined position where the blow-molding operation is conducted, whereby the plastics container provided with the chime in its top portion is molded.

According to a third aspect of the present invention, there is provided a blow-molding apparatus for a plastics container, in which apparatus: there are provided a lower mold provided with a concave portion for forming a top portion of the plastics container having a chime in its top portion, which concave portion has a predetermined configuration with predetermined width and height; and a pair of opposite side molds for molding a side and bottom portions of the plastics container, which lower mold is lifted toward a die by means of a lift cylinder to form a predetermined clearance between the die and itself so that a predetermined amount of a molten resin is extruded from the die, and then the lower mold is further lifted by means of the lift cylinder to be brought into a press contact with the die so that the top portion of the plastics container is molded, and thereafter the molten resin is further extruded from the die at a predetermined parison speed according to which speed the lift cylinder is lowered to a predetermined position so that the lower mold is lowered to a predetermined position where the opposite side molds are closed so that a blow-molding operation is conducted to mold the plastics container provided with the chime in its top portion characterized in that:

an outside ring portion of the concave portion of the lower mold constitutes a separate split mold between which split mold and the lower mold there is provided a connecting means for selectively connecting the split mold with the lower mold.

According to a fourth aspect of the present invention, there is provided a plastics container which is a plastics container molded by a blow-molding method and provided a chime in its top portion, which plastics container is provided with: an annular projection formed in an outer periphery of the chime; suitable numer of ring-like bands formed in an outer periphery of a trunk portion of the plastics container, a diameter of each of which ring-like bands is similar to an outer diameter of the annular projection; a ground plate which is formed into a size adapted to an inner diameter of the chime in its bottom surface by virtue of its curved surface portion provided in an outer periphery of the plastics container; and a cross-rib portion provided inside the ground plate in projecting manner and having a pinch-off portion.

BRIEF DESCRIPTION OF THE DRAWINGS

FIGS. 1 to 3 are views showing an embodiment of a molding method of a plastic container according to the present invention, wherein:

FIG. 1 shows a condition in which the lower mold is positioned near the the die from which the molten resin is extruded;

FIG. 2 shows a condition in which the lower mold is brought into a press contact with the die so that the top porportion of the plastics container in which top portion the chime is provided is molded;

FIG. 3 shows a condition in which the lower mold is lowered;

FIGS. 5 to 9 show a partial improvement of the above embodiment of the molding method of the plastics container according to the present invention. wherein:

FIG. 5 shows a condition in which the lower mold begins to be lowered;

FIG. 6 shows a condition in which the lower mold is temporarily held in a stationary condition after it is lowered;

FIG. 7 shows a condition in which the side molds are closed;

FIG. 8 shows a condition in which the lower mold is lifted again to be brought into a press contact with the side molds;

FIG. 9 shows a condition in which the blow-molding operation is completed and the thus molded plastics container is ejected from the lower mold;

DESCRIPTION OF THE PREFERRED EMBODIMENTS

Figure 1:
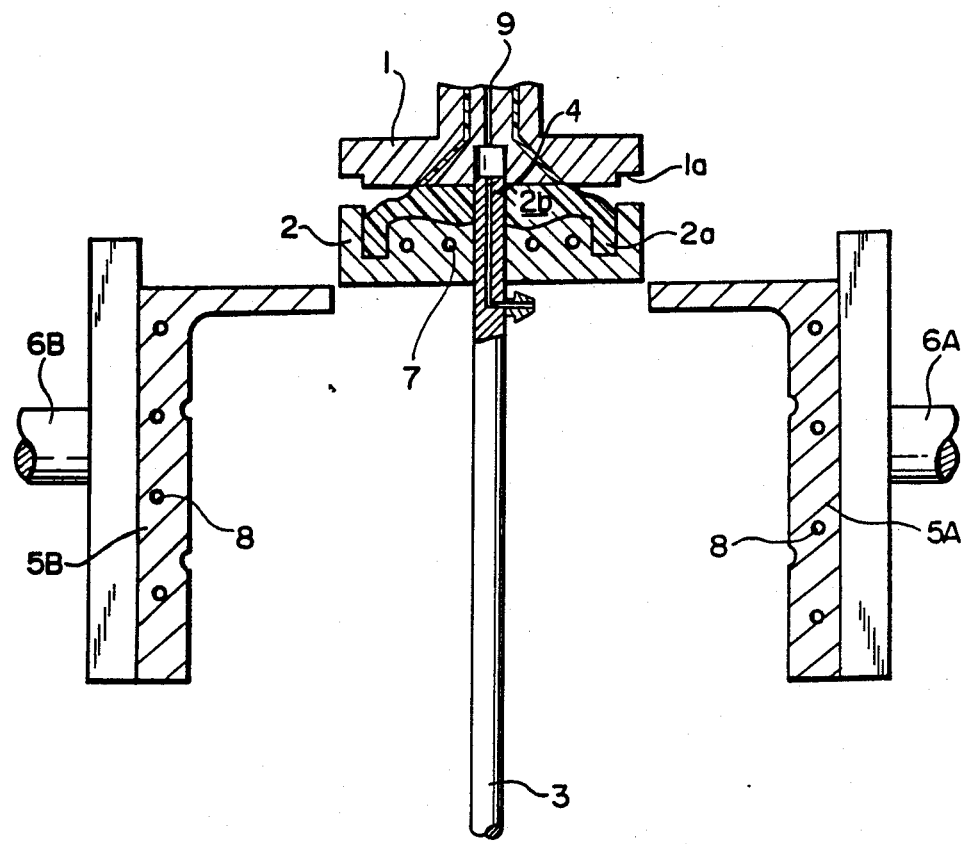

According to a molding method of a plastics container of the present invention, a mold is divided into three pieces of: a lower mold for molding a top portion of the plastics container which top portion is provided with a chime; a mold for molding a side portion of the plastics container and a pair of side molds for molding a bottom portion of the plastics container, so that the top portion of the plastics container which top portion is complex in its construction is firstly molded in the lower mold to make it possible that a chime having a desired configuration is easily molded as it is designed. Further, according to the molding method of the present invention, a speed of a lift cylinder for conducting an up-and-down movement of the lower mold is adjusted to meet with a flow speed of a parison so that so-called dripping of the resin is prevented, and whereby it is possible to mold the plastic container as it is designed with the use of any resin without producing a biased wall portion in the plastics container.

The molding method of the present invention will be described with reference to the drawings.

In FIGS. 1 to 4, wherein: the reference numeral 1 designates a die for extruding a molten resin; the numeral 2 designates a lower mold provided with a concave portion 2a having a predetermined configuration and predetermined width and height for molding a top portion of the plastics container; the numeral 3 designates a lift cylinder for conducting an up-and-down movement of the lower mold 2; the numeral 4 designates an air nozzle provided in the lift cylinder 3; the numerals 5A and 5B designate a pair of opposite side molds for molding a side portion and a bottom portion of the plastics container; the numerals 6A and 6B designate transfer cylinders for transferring the side molds 5A and 5B; the numeral 7 designates a hole for passing heated steam or cooling water; and the numeral 8 designates a cooling water hole. All of the inner surfaces of the molds 2, 5A, 5B and the lower surface of the die 1 are coated with fluorine contained resin. Incidentally, a notch portion 1a is formed in a periphery of the die 1, in which notch portion 1a the lower mold 2 is inserted to make it possible to extrude the resin received in the central concave portion 2b of the lower mold 2 so that a cavity is prevented from being produced in the molded plastics container. Further, it is possible to control a wall thickness of the plastics container by adjusting a travelling distance of the lower mold 2. However, it is also possible to extrude a larger amount of the resin than a volume of the concave portion 2b without providing the notch portion 1a. Incidentally, it is also possible to provide a taper in an inner peripheral surface 2c of the concave portion 2a so that a draft is provided between such inner peripheral surface 2c and the notch portion 1a.

Now, the embodiment of the molding method of the plastics container provided with the chime in its top portion, in which method the above-mentioned molds are employed, will be described.

According to the embodiment of the molding method of the present invention, the lower mold 2 is lifted toward the die 1 by means of the lift cylinder 3 to form a predetermined clearance between the die 1 and the lower mold 2, which clearance is adjusted according to a necessary amount of the resin to be molded. In this condition. the molten resin is measured by means of, for example such as a timer and extruded from the die 1 as shown in FIG. 1.

Figure 2:
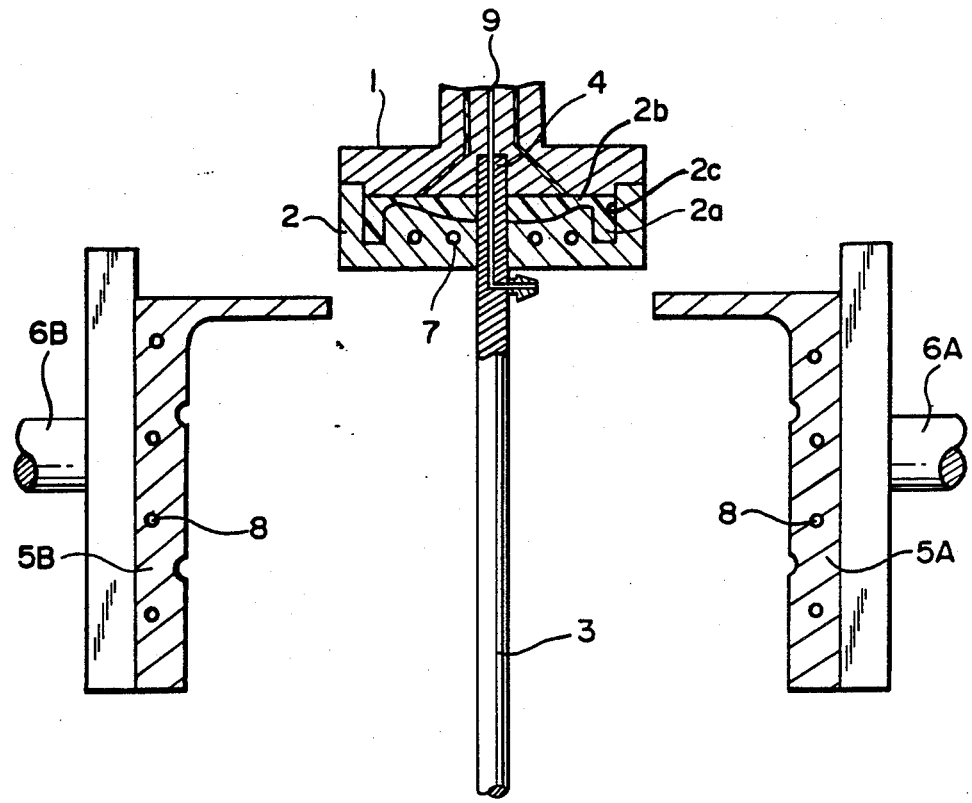

Then, after such measurement of the molten resin, the lower mold 2 is lifted again by means of the lift cylinder 3 to be brought into a press contact with the die 1, whereby the top portion of the plastics container, which top portion is provided with the chime, is molded as shown in FIG. 2.

Figure 3:
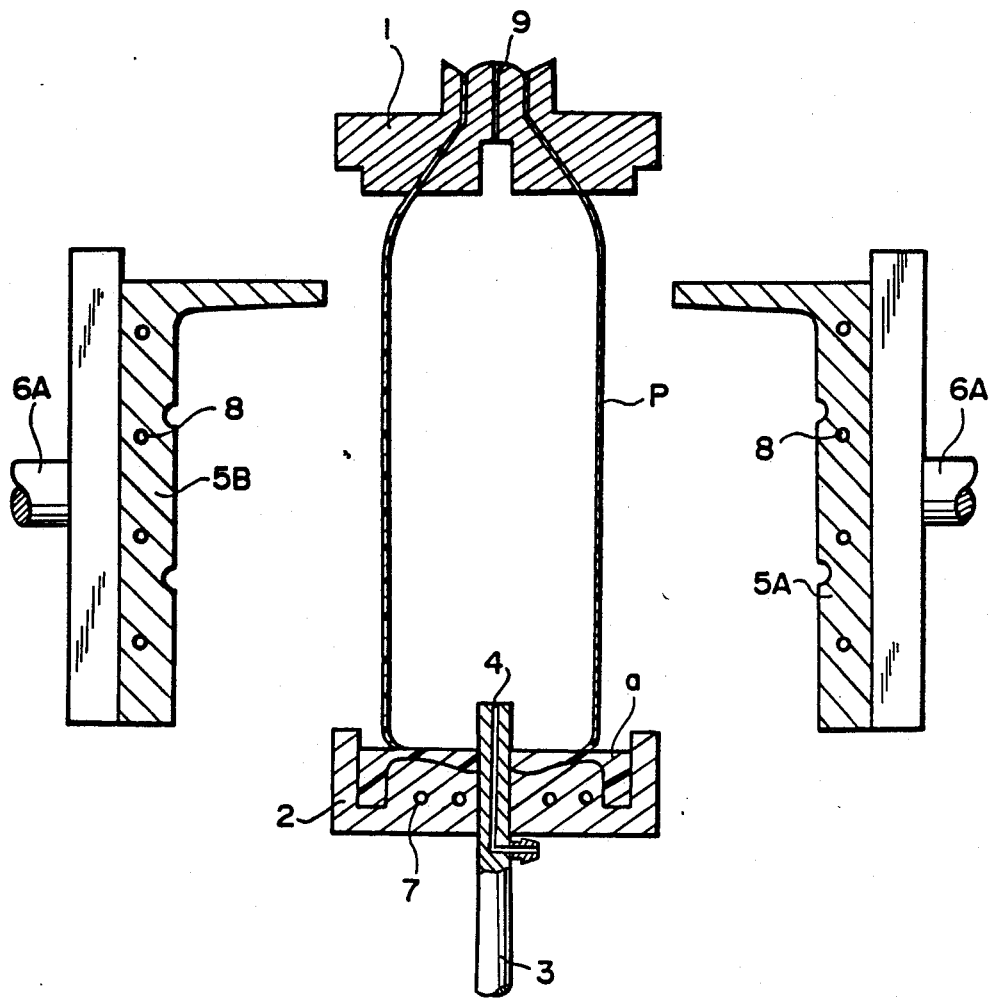
Figure 4:
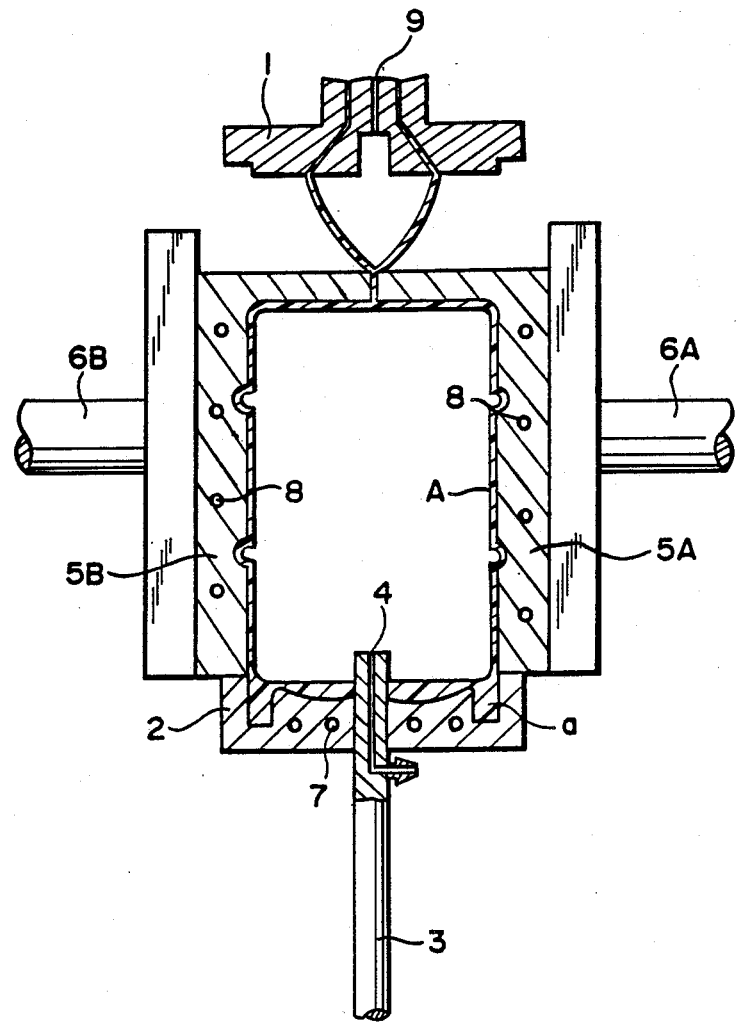
FIG. 4 shows a condition in which the lower mold is lowered to a predetermined position while the opposite side molds are closed to make it possible to conduct a blow-molding operation.

Then, the molten resin received in an accumulator is extruded from the die 1 by means of a ring piston, and at this time a small amount of air is injected from a pre-blow air nozzle 9 in order to prevent the parison from being in a vacuum condition, while the lower mold 2 is lowered by the lift cylinder 3 according to a parison speed so that a parison P is formed in expanded condition, which parison P is provided with a chime 4a in its lower end as shown in FIG. 3. After the lower mold 2 is lowered to a predetermined position, the opposite side molds 5A and 5B are closed so that a pressurized air is injected from the nozzle 4 to conduct a blow-molding operation as shown in FIG. 4. In the blow-molding operation, the plastics container is molded in an inverted condition. In use, the plastics container is used in its normal condition. Therefore, according to the present invention, it is possible to obtain the plastics container "A" provided with a chime "a" in its top portion.

Although, in the above embodiment of the present invention, the number of the nozzle 4 is only one, it is also possible to employ a plurality of nozzles 4 as required.

As described above, according to the molding method of the plastics container of the present invention, it is possible to mold the top portion of the plastics container, which top portion is provided with the chime, as it is designed, and to prevent the dripping of the resin so that it is possible to mold the plastics container having a wall thickness as designed.

However, in this molding method, there is a problem in that it is difficult to stop the lower mold 2 in a predetermined lowered position shown in FIG. 3 in a precise manner due to an adjusting accuracy of a limit switch for controlling a position of the lift cylinder 3.

As a result, when the lower mold 2 is stopped in a position higher than a predetermined position, the side molds 4a, 4b interfere with the lower mold 2 to be jammed when they are closed. On the other hand, when the lower mold 2 is stopped in a position lower than a predetermined position, a clearance is produced between the side molds 4a, 4b and the lower mold 2 so that the blow-molding operation can not be conducted in a correct manner, whereby the molded product varies in its accuracy. Consequently, the above-mentioned problem makes it difficult to automate the molding operation.

Further, in this molding method, there is another problem in that an impact strength of the molded container decreases because a local thin wall portion Q is produced in a portion of the parison P due to a shrinkage of the parison P, which shrinkage leads to a decrease of a weld strength of the parison P in its resin material. In order to resolve the above another problem, another molding method is proposed according to the present invention. According to this another molding method, the lower mold is lifted to be brought into a press contact into the die so that a top portion of the plastics container is formed, and thereafter a molten resin is extruded from the die while the lower mold is lowered by means of the lift cylinder to a position lower than a predetermined position, in which lower position the lower mold is stopped while the side molds are closed, and then the lower mold is lifted again by means of a lift cylinder to be brought into a abutting contact with the side molds so that the lower mold is positioned in a predetermined position where the blow-molding operation is conducted, so that the plastics container provided with the chime in its top portion is molded.

Consequently, it is possible to position the lower mold in a predetermined position according to the above another molding method, so that the lower mold is easily brought into a press contact with the side molds, whereby a clearance between the side molds and the lower mold is eliminated. As a result, it is possible to prevent the side molds from being jammed with respect to the lower mold, and also possible to conduct the blow-molding operation in a correct manner to make it possible to automate such blow-molding operation. Further, it is also possible to decrease the shrinkage of the parison so that the local thin wall portion is prevented from being produced in the top portion of the parison, whereby the weld strength of the parison in its material is increased and in turn the impact strength of the thus molded container is also increased.

It is preferable to set the lower position where the lower mold is temporarily stopped, in a position lower than the bottom portion of the side molds by a distance of 10 to 50 mm.

The above another molding method of the present invention will be described hereinbelow with reference to the drawings.

In FIGS. 1 to 5, the reference numeral 2 designates a lower mold provided with a concave portion 2a which has a predetermined configuration and predetermined width and height for molding a top portion of a plastics container, which top portion is provided with a chime c. However, in this embodiment, in contrast with the embodiment shown in FIGS. 1 to 4, an outer portion of the concave portion 2a of the lower mold 2 constitutes a separate split mold which is a chime ring 2b which is detachably attached to the lower mold 2 through a suitable means (not shown). The reference numeral 3 designates a lift cylinder for conducting an up-and-down movement of the lower mold 2; the numeral 5A and 5B designate a pair of opposite side molds for molding a side portion and a bottom portion of the plastics container, in lower portions of which side molds 5A and 5B there are provided notch portions 5C. All of the inner surfaces of the lower mold 2 and the side molds 5A, 5b are coated with fluorine contained resin.

Figure 5:
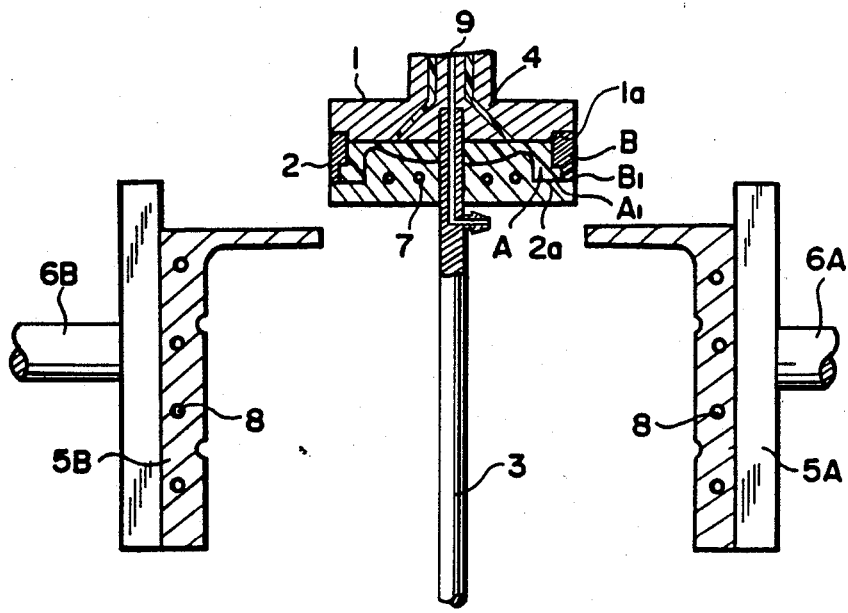
Figure 6:
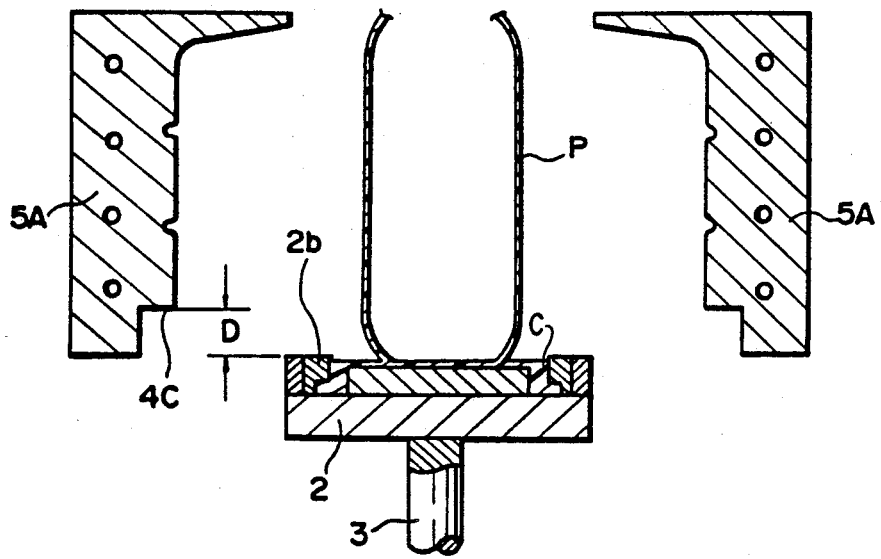

After molding the top portion provided with the chime of the plastics container according to the molding operation shown in FIGS. 1 and 2, a molten resin received in an accumulator is extruded from the die 1 by means of a ring piston, while a small amount of air is injected from a pre-blow nozzle 9 in order to prevent the parison P form being in a vacuum condition, and at this time, the lower mold 2 is lowered by the lift cylinder 3 at a speed similar to the parison speed as shown in FIG. 5, so that the lower mold 2 is temporarily stopped in a position slightly lower than the bottom portions of the side molds 5A, 5B, i.e., lower than a lever of the notch portions 5C of the side molds 5A, 5B by a distance D of 10 to 50 mm, whereby the parison P provided with the chime C in its lower end is formed in an expanded condition as shown in FIG. 6.

Figure 7:
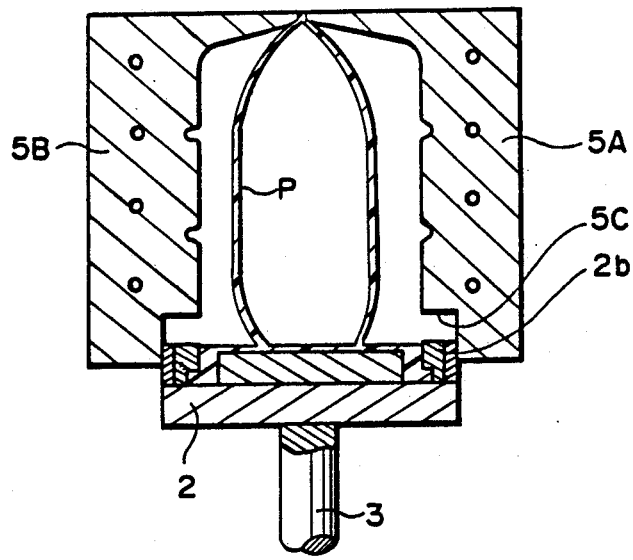
Figure 8:
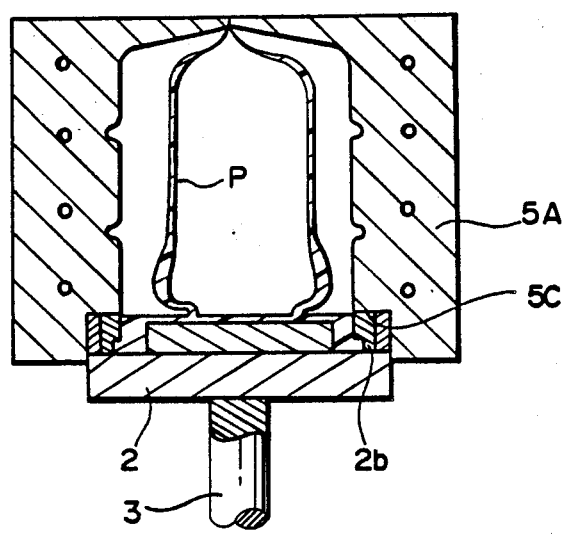
Figure 9:
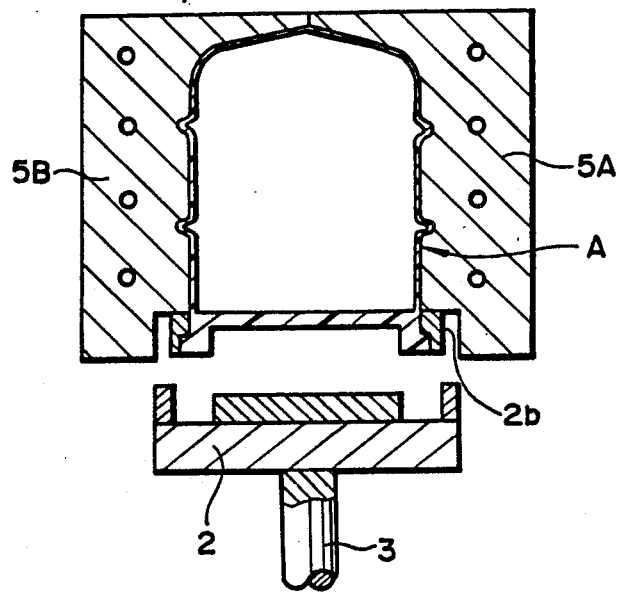

Then, the side molds are closed as shown in FIG. 7. After the side molds 5A, 5B are closed, the lower mold 2 is lifted again by the lift cylinder 3 so that the chime ring 2b is brought into an abutting contact with the notch portions 5C of the side molds 5A, 5B, whereby the clearance between the lower mold 2 and the side molds 5A, 5B is eliminated as shown in FIG. 8. In this condition, a pressurized air is injected into the parison P from a nozzle (not shown) so that the blow-molding operation is performed. After the blow-molding operation is finished, the chime ring 2b is disconnected from the lower mold 2 so that the lower mold 2 is lowered by the lift cylinder 3, whereby the lower mold 2 is separated from the molded container "A" as shown in FIG. 9. Finally, the side molds 5A, 5B are opened while the chime ring 2b is split to be separated from the molded container "A", so that the plastics container "A" provided with the chime C in its top portion is obtained.

According to the molding method of the present invention as described above, it is possible to eliminate the clearance between the side molds 5A, 5B and the lower lold 2 so that the side molds 5A, 5B are prevented from being jamed with respect to the lower mold 2 and the blow-operation of the pressurized air in the blow-molding operation is correctly conducted, whereby it is possible to automate the molding method of the present inventio. Further, at this time, it is also possible to decdrease the shrinkage of the parison P so that it is possible to prevent the local thin wall portion from being produced in a parison's portion corresponding to the top portion of the molded container, whereby the weld strength of the parison P in its material is increased, and in turn the impact strength of the molded container is also increased.

In the above molding method of the present invention, it is possible to employ the following molding apparatus, an embodiment of which apparatus is shown in FIGS. 1 to 9. Namely, in FIG. 1, the reference numeral 1 designates a die; the numeral 2 designates a lower mold provided with a concave portion 2a which has a predetermined configuration and predetermined width and height for molding a top portion of the plastics container, which top portion is provided with a chime; the numeral 3 designates a lift cylinder for conducting an up-and-down movement of the lower mold 2; the numeral 4 designates an air nozzle provided in the lift cylinder 3; the numerals 5A, 5B designate a pair of opposite side molds for molding a side portion and a bottom portion of the plastics container; the numerals 6A, 6B designate a pair of opposite transfer cylinders for transferring the side molds 5A, 5B; the numeral 7 designates a hole for passing a heated steam and a cooling water; the numeral 8 designates a cooling water hole formed in the side molds 5A, 5B; and all of the inner surfaces of the side molds 5A, 5B and a lower surface of the die 1 are coated with fluorine contained resin. Incidentally, in a periphery of the die 1, there is formed a notch portion 1a in which the lower mold 2 is inserted.

On the other hand, in order to facilitate the use of the drum handling machine, i.e., a drum clipper in a handling operation of the drum, in some cases there is provided a projecting portion in an outer periphery of an upper portion of the chime "A". In such cases, as shown in the molding method of FIGS. 5 to 9, an outer ring portion of the concave portion 2a of the lower mold 2 constitutees a separate split mold, i.e., a chime ring B which corresponds to the projecting portion of the cime "A" to make it possible that the chime ring B is split so as to be separated from the chime "A" when the molding operation is finished.

However, the above molding apparatus of the present invention has the following problem: namely, in this molding apparatus, the lower mold 2 is lifted so that the die 1 is brought into a press contact with the the lower mold 2, whereby the top portion of the plastics container is molded. After such molding operation of the top portion of the plastics container, the lower mold 2 is lowered to perform a parting operation of the mold. However, in this parting operation, the molten resin in the chime "A" portion expands again so that the chime ring B is pushed upward at the notch portion B1 thereof, whereby the chime ring B often floats. Consequently, a top portion of the chime ring B often projects upward beyond a predetermined position at a time when the lower mold 2 is lowered to a predetermined position. As a result, when the side molds 5A, 5B are closed, they interfere with the chime ring B to be jamed, while the projecting portion of the chime "A" varies in its width. When such problem occurs one step of process is required in the parting operation of the lower mold 2 so that much more time is required in the molding operation of the plastics container, whereby it is difficult to automate such molding operation.

The above problem can be resolved by constituting the ring portion of the outer side of the concave portion of the lower mold as a separate split mold and also by providing a suitable connecting means for selectively connecting such split mold to the lower mold between such split mold and the lower mold.

By employing the above molding apparatus of the present invention, it is possible to prevent the split mold from foating through the suitable connecting means which connects the split mold to the lower mold in the parting operation of the lower mold. Consequently, it is also possible to prevent the side molds from interfering with the split mold so that they are prevented from being jamed, while fins are prevented from being produced in an upper edge portion of the chime. As a result, it is possible to reduce one step of process in the parting operation preformed by the conventional molding apparatus, whereby it is possible to reduce a necessary time of the molding operation of the plastics container, while such molding operation can be automated.

In the embodiment of the molding apparatus of the present invention, it is preferable to construct such suitable connecting means from: a ring fixed to the lower mold and surrouding the split mold; and electromagnetic holder embedded in the ring through a suitable non-magnetic material member; and a rectifier or a switch for selectively supplying DC electric power to the holder.

Further, it is also possible to employ a mechanical connecting means in place of the above magnetic connecting means. In this case, it is preferable to employ a pin projected by a cylinder-piston unit as such mechanical connecting means.

These connecting means will be described with reference to FIGS. 10 and 11, hereinbelow.

Figure 10:
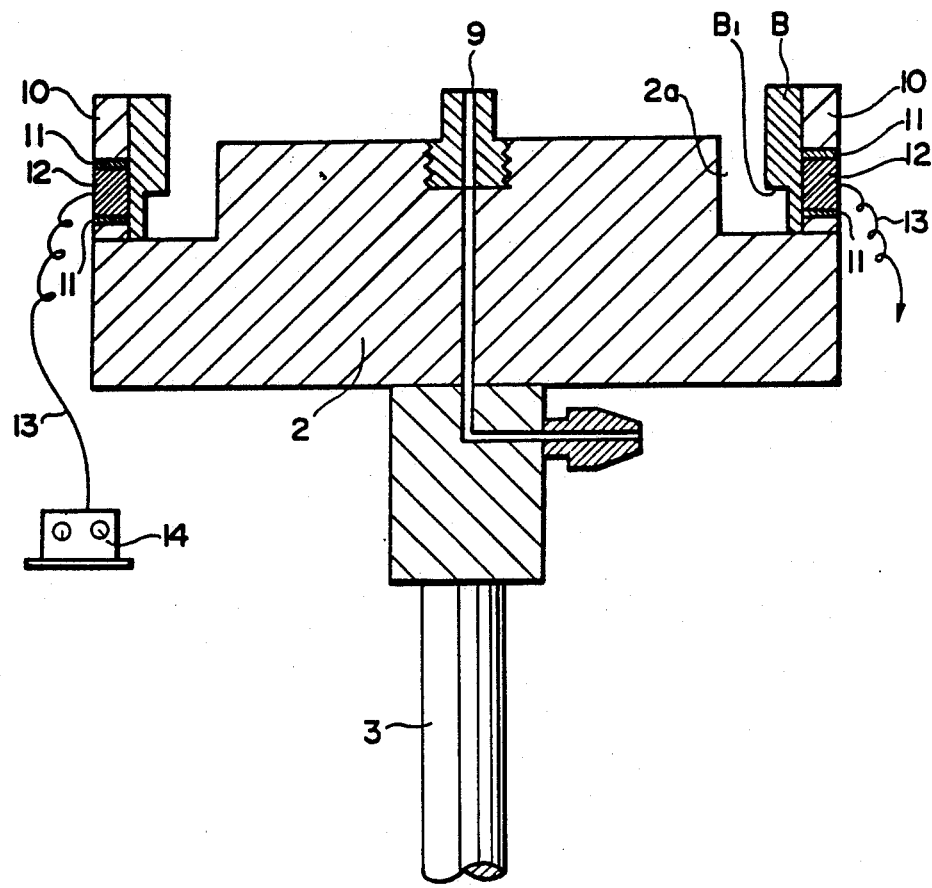
FIGS. 10 and 11 show longitudinal sectional views of the lower mold employed in the molding apparatus of the present invention.

In FIG. 10, portions corresponding to those of FIGS. 1, 2 and 5 are designated with the same reference numerals as those employed inn FIGS. 1, 2 and 5, so that such corresponding portions will not be described hereinbelow to avoid repeating the descriptions of such corresponding portions.

As shown in FIG. 10, on an upper surface of the lower mold 2, there is mounted a chime ring B which is a separate split mold with respect to the lower mold 2, which chime ring B is provided with a notch portion B1 corresponding to the projecting portion A1 of the chime "A" shown in FIG. 5. A ring 10 surrounding the chime ring B to form a slight clearance therebetween is fixed to the lower mold 2 through a suitable means (not shown). For example, in suitable manner of portions of a circumferential wall of the ring 10, there are embedded suitable number of magnetic holders 12 through suitable non-magnetic material members such as brass frames 11. The magnetic holders 12 are connected to a rectifier 14 through lead wires 13 so that the electric power is selectively supplied to the magnetic holders 12 by intermittently supplying the current to the rectifier 14, whereby the magnetic holders 12 are intermittently excited.

Now, the molding operation of the plastics container which is provided with the chime in its top portion, and which operation is conducted with the use of the above-mentioned mold of the present invention will be described hereinbelow.

The lower mold 2 is lifted by the lift cylinder 3 to a position near the die 1 so that a predetermined clearance is formed between the lower mold 2 and the die 1, which clearance is adjusted according to a necessary amount of the resin. In this condition, necessary amount of the resin is measured by means of, for example such as a timer, so that a molten resin is extruded from the die 1.

Then, after the resin is measured, the lower mold 2 is lifted again by the lift cyinder 3 so that the lower mold 2 is brought into a press contact with the die 1 to mold the top portion of the plastics container, which top portion is provided with the chime "A" as shown in FIG. 2.

Then, the rectifier 14 is turned so that the current is supplied to the magnetic holders 12 to excite the sames, whereby the chime ring B is connected to the lower mold 2 through the ring 10, and the molten resin received in an accumulator is extruded from the die 1 by means of a ring piston while a small amount of air is injected into the parison to prevent the parison from being in a vacuum condition. At this time, the lower mold 2 is lowered by the lift cylinder 3 at a speed according to a parison speed so that the parison P provided with a chime 4a in its lower end is formed in an expanded condition. At this time, the molten resin in the chime "A" portion expands again so that the the chime ring B is pushed upward in its notch portion B1 in the parting operation of the lower mold 2. However, since the the chime B is connected to the lower mold 2 through the magnetic holders 12 and the ring 10, the chime ring B is prevented from floating. When the lower mold 2 is lowered to a predetermined position, the opposite side molds 5A, 5b are closed, and then the pressurized air is injected into the parison to perform the blow-molding operation of the plastics container. When the blow-molding operation the containr is finished, the rectifier 14 is turned off so that the supplying of the current to the magnetic holders 12 is stopped to disconnect the chime ring B from the lower mold 2, whereby the lower mold 2 is lowered by the lift cylinder 3 to be separated from the molded container. Finally, the side molds 4A, 4B are opened, and the chime ring B is split to be separated form the molded container, so that the plastics container provided with the chime "A" in its top portion is obtained.

Figure 11:
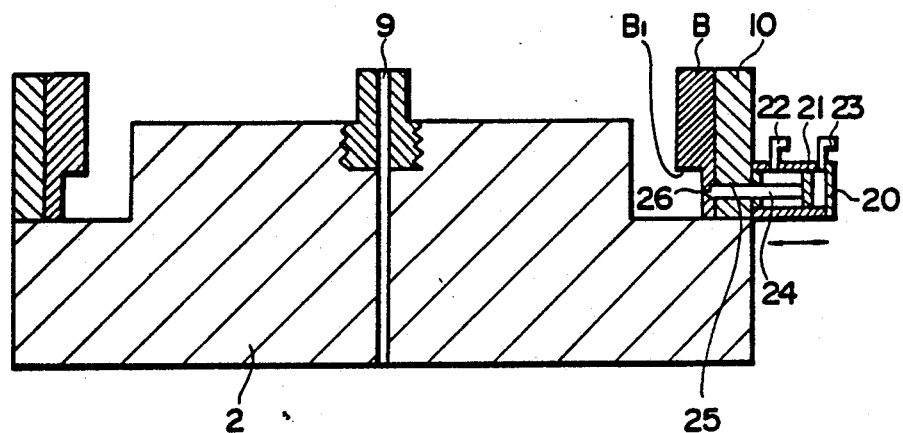

In FIG. 11, there is shown another embodiment of the connecting means for connecting the chime ring B to the lowe mold 2, in which another embodiment the chime ring B is mechanically connected to the lower mold 2 not magnetically. In such another embodiment, on suitable number of portions of circumferential wall of the ring 10, there are mounted cylinders 20 which is provided with feeding/discharging pipes 22, 23 of the fluid such as oil, air and the like for actuating a piston 21. A pin 24 fixed to the piston 21 is so constructed that the pin 24 can extend radially inwardly through a hole 25 provided in the ring 10 and another hole 26 provided in the chime ring B. Consequently, when the fluid is supplied to the cylinder 20 from the pipe 23, the pin 24 is radially and inwardly porjected so that the pin is inserted into the hole 26, whereby the chime ring B is connected to the lower mold 2. When the fluid is supplied to the cylinder 20 from the pipe 22, the pin is retracted from the hole 26 so that the chime ring B is disconnected from the lower mold 2.

In the above molding apparatus of the present invention, since the ring-like portion of the outerside of the concave portion of the lower mold 2 is formed into a separate split-type mold and a suitable connecting menas for connecting such slit-type mold to the lower mold 2 selectively is provided therebetween, it is possible to prevent the split mold from floating apart from the lower mold 2 at a time of the parting operation of the lower mold 2 so that the slit mold is prevented from interfering with the side molds, whereby the side molds are prevented from being jamed and fins are prevented from being produced in the upper edge portion of the chime. As a result, it is possible to reduce one step of process in the parting operation the mold relative to the case where the conventional molding apparatus is employed, so that the necessary time cycle time of the molding operation is also reduced and such molding opertion can be automated.

Figure 15A:
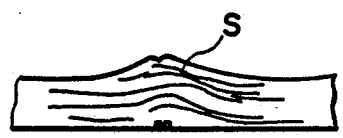
FIGS. 15A to 15C show sectional configurations of the pinch-off portion.
Figure 15B:
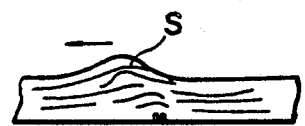
Figure 15C:
Figure 15D:
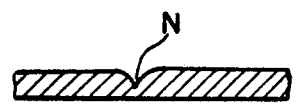

However, in the above-mentioned blow-molding apparatus, there is a problem in that a V-shaped notch N is apt to be produced as shown in FIG. 15D so that the molded product is decreased in its drop impact strength and is apt to be easily exfoliated.

Figure 15E:
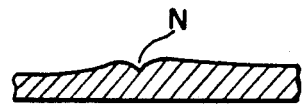

In order to resolve this problem, hitherto the configureation of the pinch-off portion of the mold and the molding conditions, particularly the clamping speed of the mold are modified, for example, as to the clamping speed of the mold it is decreased, whereby the V-shaped N in the pinch-off portion is improved to the extent of a notch configuration shown in FIG. 15E. However, such improvement is not sufficient, and even impairs the operativity of the molding apparatus due to the reduction of the clamping speed of the mold. The inventor of the present invention has been found that the cooling speed of the parison causes the above problem, so that the problem is resolved by provisions of passages for feeding the cooling air to each of the split-type molds in their pinch-off portions and by provisions of passages for sucking the air received in the mold and by provisions of porous members in opening portions of theses passages in embedding manner.

By employing the above construction, it is possible to form a thin wall of the parison by cooling a contacting portion of the parison with a metal portion of the pinch-off portion of the mold under the effect of a cooling air injected into the mold from the passages which are provided in the pinch-off portion. The air injected into the mold is then sucked so that the contacting portion of the parison to the metal of the pinch-off portion is brought into a close contact with the mold, whereby the V-shaped notch N is prevented from being produced and a padding operation also can be conducted. As a result, the molded product is improved in its drop impact strength and in its exfoliating resistance.

In the embodiment of the molding apparatus of the present invention, the above-mentioned porous members are preferably made of sintered metal, so that it is possible to conduct the injection action of the cooling air and the sucking action of the air received in the mold without any trouble, and also possible to prevent the parison from entering the passages.

Hereinbelow, actions and effects of: the passages for injecting the cooling air and the passages for sucking the air received in the mold and the porous members embedded in the opening portions of these passages will be described with reference to FIGS. 12 to 14. The molding apparatus shown in FIGS. 12 to 14 is different from that shown in FIGS. 1 to 11 in that the lower mold is integrated into the side molds to form a pair of opposite split-type molds in the molding apparatus shown in FIGS. 12 to 14.

Figure 12:
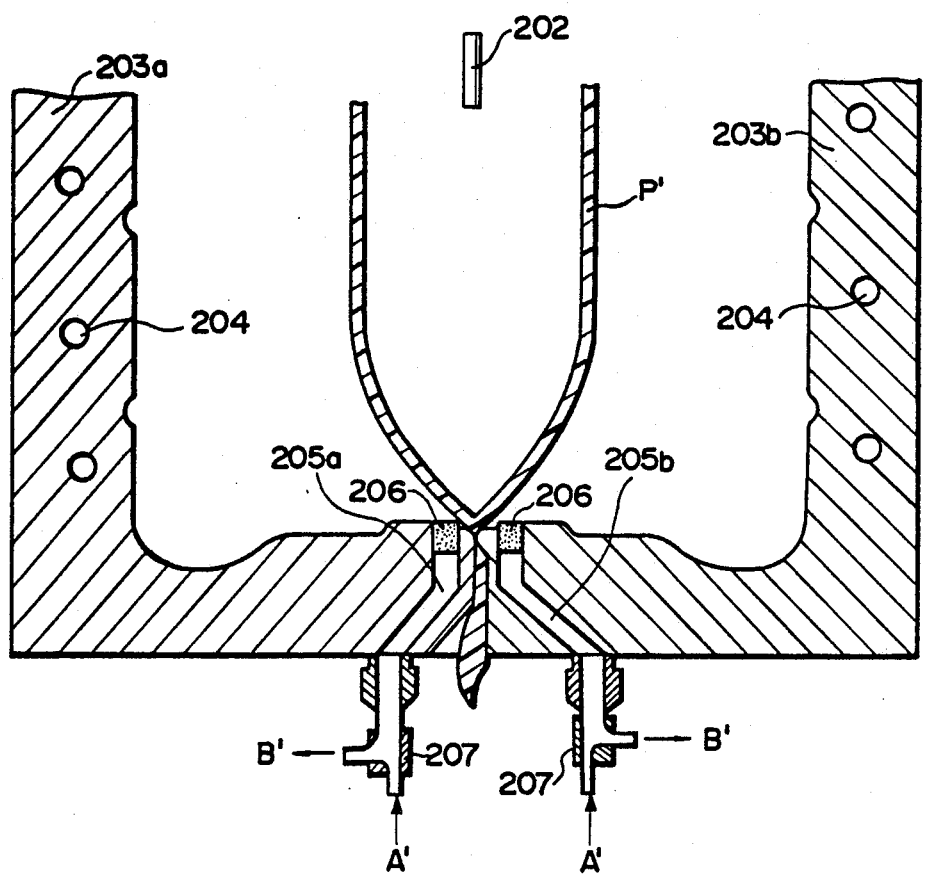
FIGS. 12 to 14 are explanatory view for showing the details of the pinch-off portion.
Figure 13:
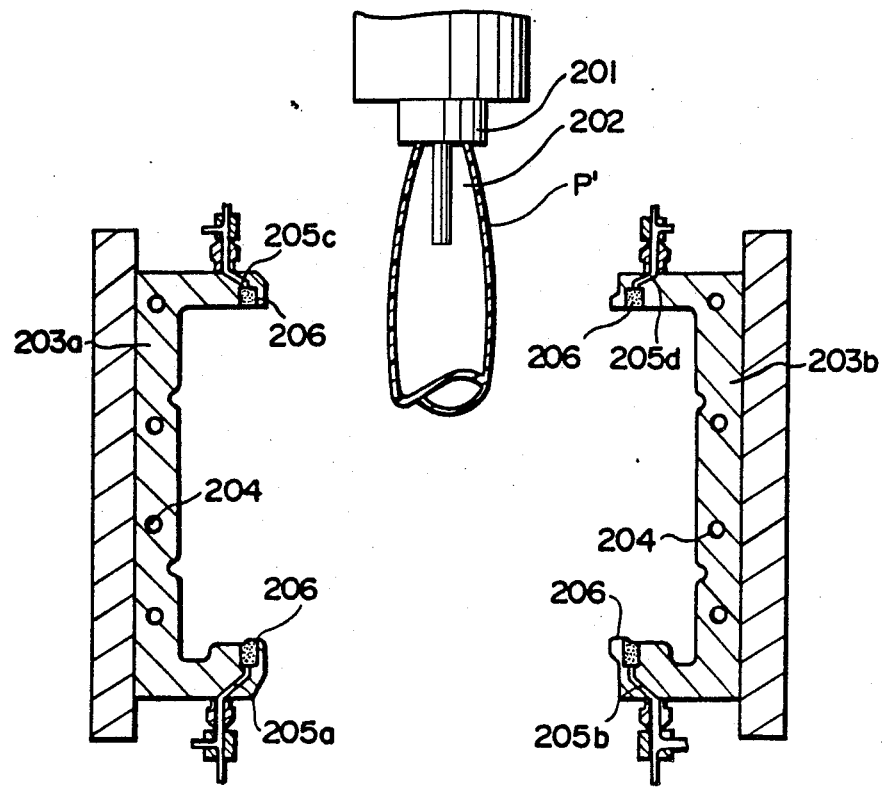
Figure 14:
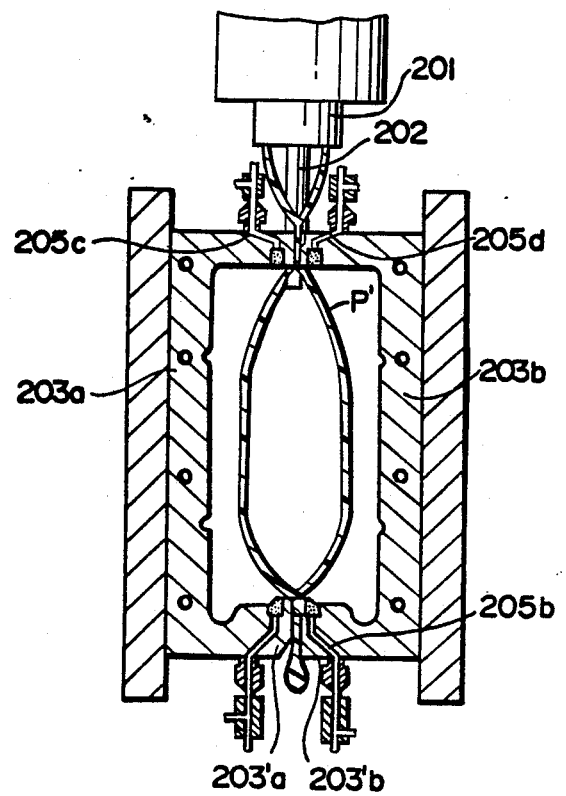

As shown in FIGS. 12 and 13, a blow nozzle 202 is provided in a central portion of the die 201 in projecting manner, which die 201 extrudes a molten resin. In a downstream side of the dies 201, there are provided a pair of opposite split-type molds 203a and 203b which are clamped by the transfer cylinders (not shown). The reference numeral 204 designates a cooling water hole provided in these molds 203a, 203b in which there are also provided suitable number of air discharging holes. Incidentally, inner surfaces of the molds 203a, 203b are coated with fluorine contained resin. A pinch-off portion of each of these molds 203a, 203b is provided with a passage 205a or 205b (hereinafter referred to as the passage 205), which passage 205 communicates with the outside, and in an opening portion of which passage 205 is embedded a plug 206 made of sintered metal which is a porous member. The passage 205 is selectively connected with a cooling air source A' (not shown) or a sucking vacuum source B' (not shown) through a connector 207.

Now, the molding operation of the plastics container conducted by the blow-molding apparatus described above will be described.

A molten resin (Hizex 8200B. MFR 0.03 g/10 min. density of 0.956 g/ml) is extruded from the die 1 (a cylinder temperature: 190° C.; a die temperature: 200° C.). The molten resin extruded from the die 1 forms the parison P' which is received by the split-type molds 203a, 203b as shown in FIG. 13.

At a time when a front end of the parison P' reaches a downstream side sufficiently lower than the the lowermost ends 203a', 203b' of the molds 203a, 203b, the molds 203a, 203b are closed so that an upper end lower ends of the molds 203a, 203b are shut as shown in FIG. 14. Immediately before completion of the clamping operation of the molds 203a, 203b, a blow-operation of the air under a pressure of, for example, 6 Kg/cm² is conducted by means of a blow nozzle 202, while a cooling air is injected into the mold from the passage 205 so that a mold portion for molding the pinch-off portion of the parison P' is cooled, whereby a surface of the parison P' is cooled to the extent that a thin film is formed on the surface of the parison P'. Then, the feeding of the cooling air is stopped in dependence on a timing of the blow-operation of air, so that the parison P' is brought into a close contact with the inner surfaces of the molds 203a, 203b in the blow-operation of air, while the air received in the mold is sucked by vacuum through the passage 205, whereby the pinch-off forming portion of the parison P' is brought into a close contact with the pinch-off portion of the mold and is formed into a configuration provided with a thick wall porion having no V-shaped notch. At a time when the cooling action of the cooling air is conducted, if the amount of the air supplied from the right passage 205b is not sufficient, a left side of the pinch-off forming portion of the molded product is more cooled so that the thick wall portion is biased on the left side of the molded product. In contrast with this case, the thick wall portion is biased to the right side of the molded product. Consequently, it is necessary to conduct the cooling operation uniformly. Further, since the air outside the parison P' is discharged from the mold through the small air discharging holes described above, the side portion of the parison P' is brought into a close contact with both of the molds 203a, 203b. Incidentally, at a time when the air received in the mold is sucked, the parison P' is prevented from being sucked into the passage 205 by means of the plug 206, so that the surface of the molded product is smoothly finished.

As described above, under the effect of the cooling air issued from the passage provided in the mold in the blow-operation, the pinch-off forming portion of the parison P' can be cooled so that the V-shaped notch is eliminated from the molded product and the thick wall portion is formed in the molded product, whereby the drop impact strength of the molded product is improved.

The plastics container molded by the above molding method and the above molding apparatus is characterized in that the plastics container is provided with a so-called chime in its top portion, which chime has a predetermined configuration and predetermined width and height.

However, when the plastics container is increased in size, many problems occur in its shipping, handling and storing. These problems are resolved by providing a plastics container cmprising: an annular projection formed in an outer periphery of a chime thereof; suitable number of ring-like bands which are formed in an outer periphery of a trunk portion of the plastics container and have a diameter substantially similar to an outer diameter of the annular projection; a ground plate which has a curved portion in its outer periphery and has a bottom surface which is formed into a size adapted to an inner diameter of the chime by means of the curved portion; and a cross-like rib which has a pinch-off portion and is formed inside the ground plate in projecting manner.

It is possible to mold such plastics container by the molding method and apparatus of the present invention described above. Further, the annular projection of the chime facilitates the use of the drum handling machine. Further, since it is possible to reduce a contact area of the plastics container by means of the annular projection and the ring-like band when the plastics container falls on the ground with respect to the ground, the plastic container can be easily changed in its direction in transferring operation thereof in a falling condition. Further, it is possible to stack the plastics containers easily by inserting the bottom surface of the ground plate of the plastics container into the inner diameter portion of the chime of another plastic container. Further, it is possible to increase a rigidity of the bottom surface of the ground plate of the plastics container by means of the cross-like rib. As a result, it is possible to effectively an easily transfer, stack and store the plastics containers of the present invention.

It is preferable to make the chime and a ceiling plate of the container thicker than the trunk portion of the same, so that it is possible to increase the impact strength of the corners of the top portion of the container. Further, it is preferable to provide a through-hole between the chime and the ceiling plate so that it is possible to discharge water stored in the ceiling plate.

Such plastics container of the present invention will be hereinbelow described with reference to the drawings.

Figure 16A:
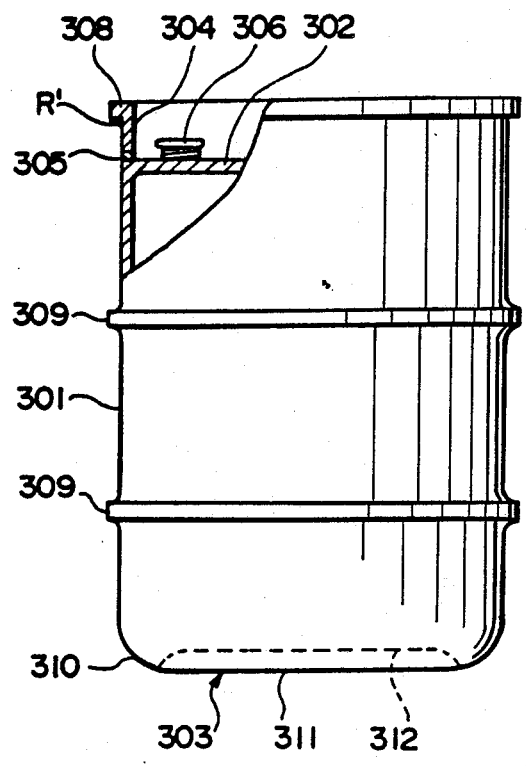
FIGS. 16A is a partially broken side view of the plastics container molded according to the molding method of the present invention.
Figure 16B:
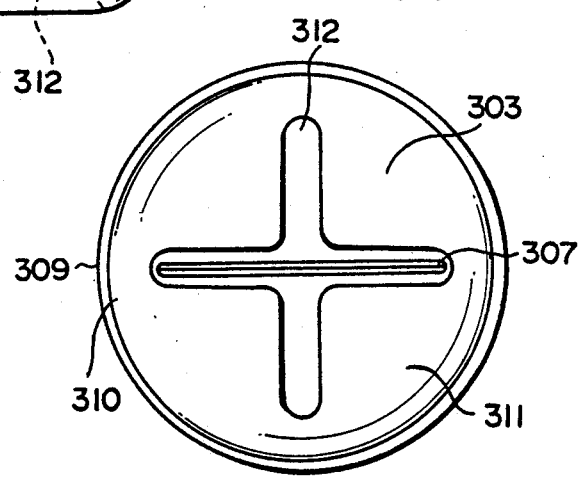
FIG. 16B is a bottom view of the thus molded plastics container.

As shown in FIGS. 16a and 16b, the plastics container, i.e., a drum of the present invention is substantially constructed of: a trunk portion 301; a ceiling plate 302 covering an upper opening of the trunk portion 301; a ground plate 303 covering a lower opening of the trunk portion 301; and a chime 304 which is provided in an upper portion of an outer periphery of the ceiling plate 302 in projecting manner and is equal in its outer diameter to that of the trunk portion 301. The ceiling plate 302 and the chime 302 are made thicker than the trunk portion 301. A through-hole 305 which communicates with the outside is provided between the chime 304 and the ceiling plate 301. Incidentally, the reference numeral 306 designates a tap; the numeral 307 designates a pinch-off portion which is laterally formed in the groun plate 303 in a straight line manner.

An annular projection 308 is formed in an outer periphery of an upper edge portion of the chime 304. In suitable positions of an outer periphery of the trunk portion 301 there are formed suitable number of ring-like bands 309 (in the embodiment shown, the number of the ring-like bands is two), an outer diameter of which ring-like band 309 is equal to that of the annular projection 308. Further, if necessary, there are provided suitable number of ribs R' in the projection 308.

In an outer periphery of the ground plate 303, there is formed a curved portion 310 leading to the trunk portion 301. By means of such curved portin 310, a bottom surface or a ground plate surface 311 of the groun plate 303 is formed into a size adapted to an inner diameter of the chime 304, in which ground plate surface 311 there is formed a pinch-off portion 307 which is included in a cross-like rib 312 formed inside the ground plate 303 in projecting manner. Since the plastics container of the present invention has the above construction, the use of the drum handling machine is faciltated by means of the projection 308 of the chime 304. Further, since it is possible to reduce a ground contacting area of the plastics container by emans of the annular projection 308 and the ring-like bands 309 when the plastics container falls on the ground, the plastics container can be easily changed in its moving direction in transferring operation thereof in a falling condition. Further, it is possible to stack the plastics containers easily by inserting the ground plate surface 311 into the inner diameter portion of the chime 304. Further, it is possible to increase a rigidity of the ground plate surface 311 by means of the rib 312. Further, it is possible to make the ceiling plate 302 and the chime 308 thicker to increase the impact strength of the corners of the top portion of the plastics container. Further, it is possible to discharge water stored in the ceiling plate 302 through the through-hole 305.

In the embodiment of the plastics container which is provided with the chime in its top portion and is molded by the blow-molding operation according to the present invention, since the plastics container comprises: the annular projection 308 formed in the outer periphery of the chime 304 thereof; suitable number of the ring-like bands 309 which are formed in the outer periphery of the trunk portion 301 of the plastics container and have the diameter substantially similar to the outer diameter of the annular projection 308; the ground plate 303 which has the curved portion 310 in its outer periphery and has the bottom surface or the ground plate surface 311 which is formed into the size adapted to the inner diameter portion of the chime 304 by means of the curved portion 310; and the cross-like rib 312 which has the pinchoff portion 307 and is formed inside the ground plate 303 in projecting manner, it is possible to facilitate the use of the drum handling machine, and to easily change the container in its moving direction, and to stack the containers easily, and to increase the rigidity of the ground plate surface of the container. As a result, it is possible to efficiently and easily transfer, stack and store the plastics containers.

What is claimed is:

1. A plastics container molded by a blow-molding operation and provided with a chime in its top-portion, comprising:
   an annular projection formed in an outer periphery of said chime;
   suitable number of ring-like bands formed in an outer circumferential surface of a trunk portion of said plastics container, said ring-like band being in its outer diameter similar to that of said annular projection of said chime;
   a ground plate provided with a curved surface portion in its outer periphery and having its bottom surface adapted to an inner diameter of said chime by means of said curved surface portion; and
   a cross-like rib containing a pinch-off portion therein and provided inside said ground plate in projecting manner.

* * * * *

UNITED STATES PATENT AND TRADEMARK OFFICE
CERTIFICATE OF CORRECTION

PATENT NO. : 4,903,852

DATED : February 27, 1990

INVENTOR(S) : MASUMOTO et al

It is certified that error appears in the above-identified patent and that said Letters Patent is hereby corrected as shown below:

On the cover page, Item [30], line 4, "60-25098" should read --60-75098--.

Signed and Sealed this

Twenty-eighth Day of May, 1991

Attest:

HARRY F. MANBECK, JR.

Attesting Officer

Commissioner of Patents and Trademarks